No. 809,611. PATENTED JAN. 9, 1906.
A. O. & G. HAMMER.
NET MAKING MACHINE.
APPLICATION FILED SEPT. 23, 1904.

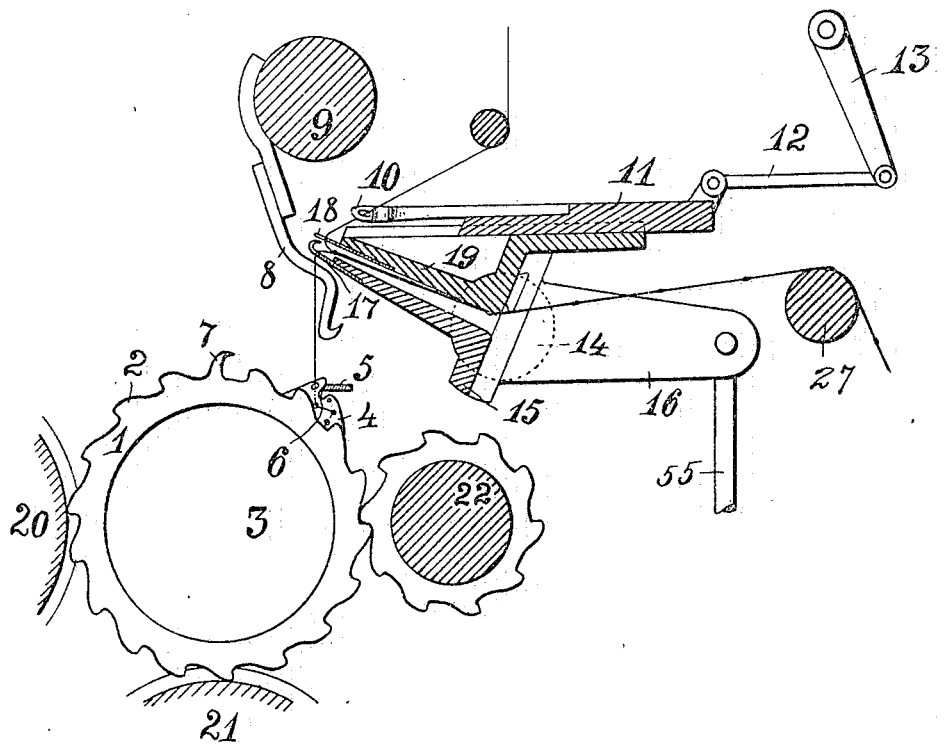

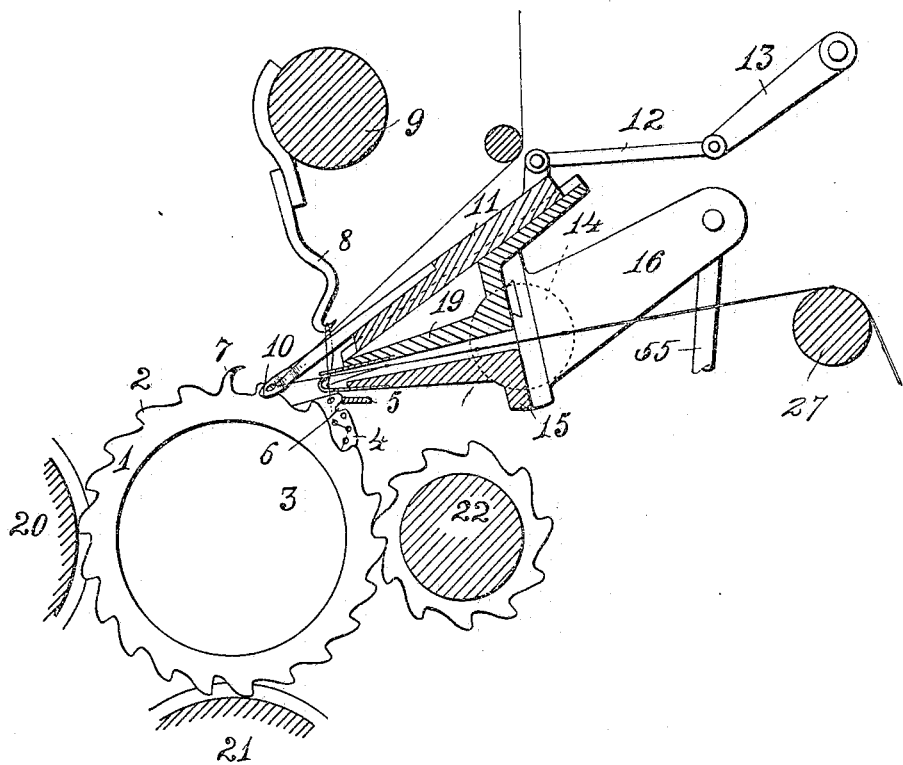
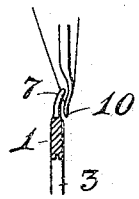
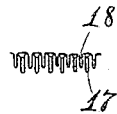

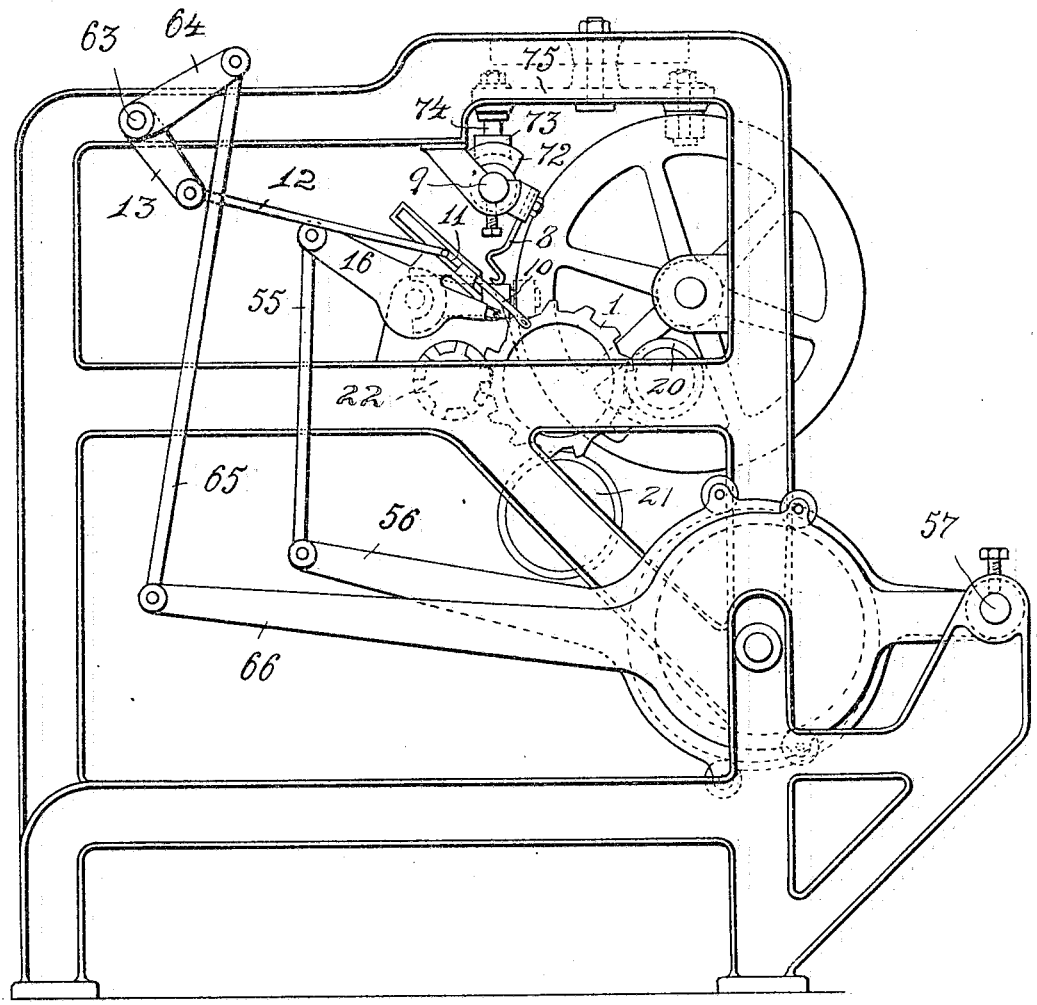

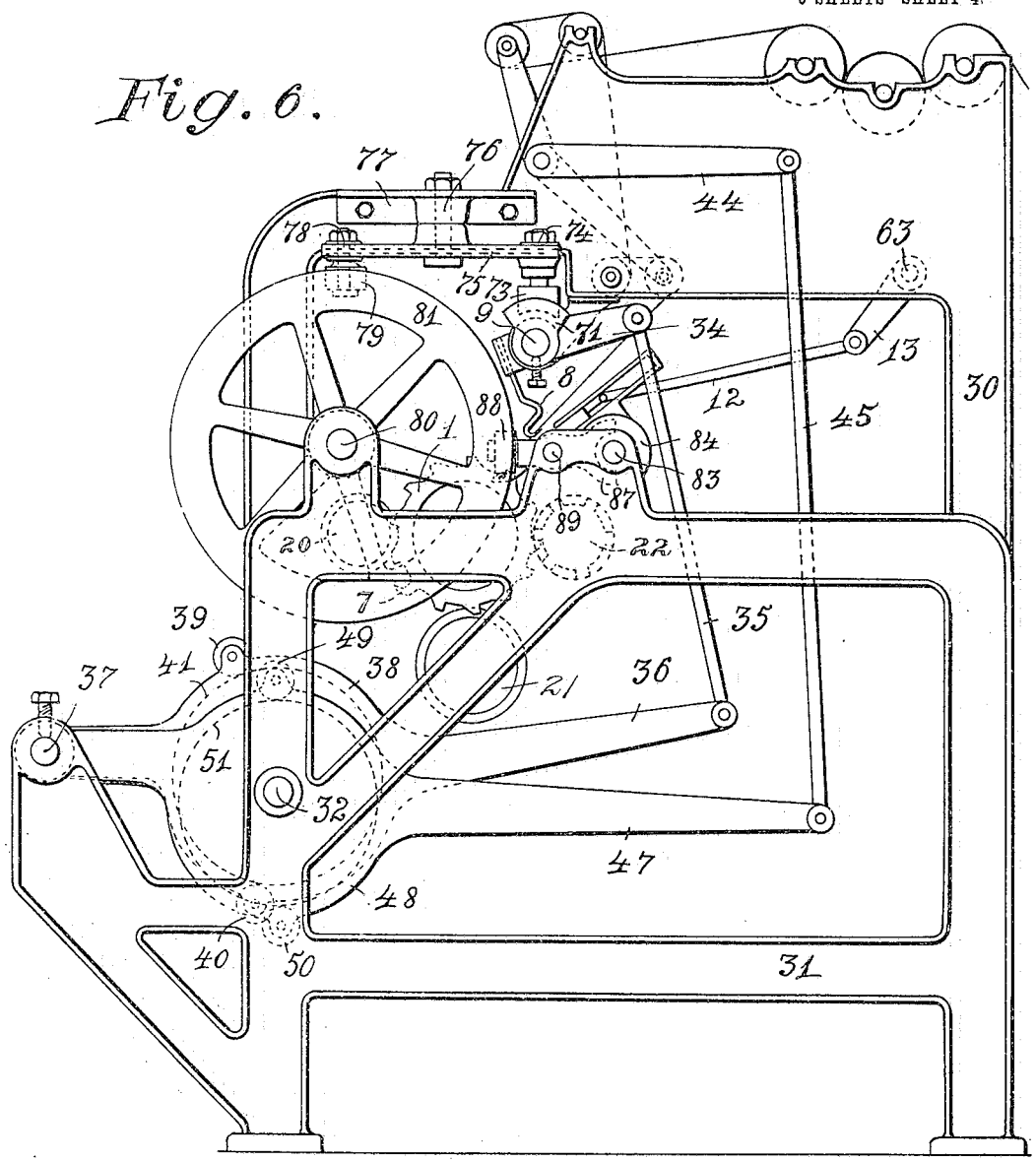

6 SHEETS—SHEET 5.

UNITED STATES PATENT OFFICE.

ALEKSANDER OSKAR HAMMER AND GUSTAV HAMMER, OF CHRISTIANIA, NORWAY.

NET-MAKING MACHINE.

No. 809,611.      Specification of Letters Patent.      Patented Jan. 9, 1906.

Application filed September 23, 1904. Serial No. 225,639.

*To all whom it may concern:*

Be it known that we, ALEKSANDER OSKAR HAMMER and GUSTAV HAMMER, subjects of the King of Sweden and Norway, residing at Christiania, Norway, have invented certain new and useful Improvements in Net-Making Machines; and we do hereby declare the following to be a full, clear, and exact description of the invention, such as will enable others skilled in the art to which it appertains to make and use the same, reference being had to the accompanying drawings, and to figures of reference marked thereon, which form a part of this specification.

Our invention relates to net-making machines, and more especially to the type of such machines described in our British Patent No. 14,608 of 1897, having around the shuttles or spools toothed rings, which have a rotatory motion and serving to seize the warp-thread and carry a loop of it around the shuttle or spool.

The object of our present invention is to simplify and improve the knot-forming mechanism; and to this end it consists in combinations of elements and certain arrangements which will hereinafter be explained, reference being had to annexed drawings, in which—

Figure 7:
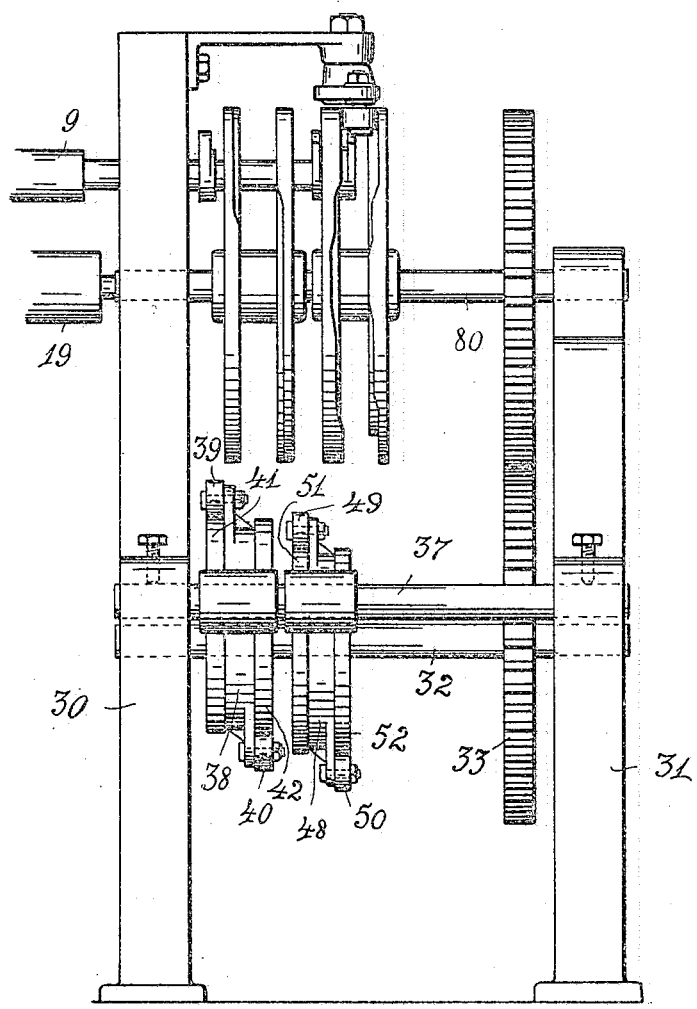
Figure 8:
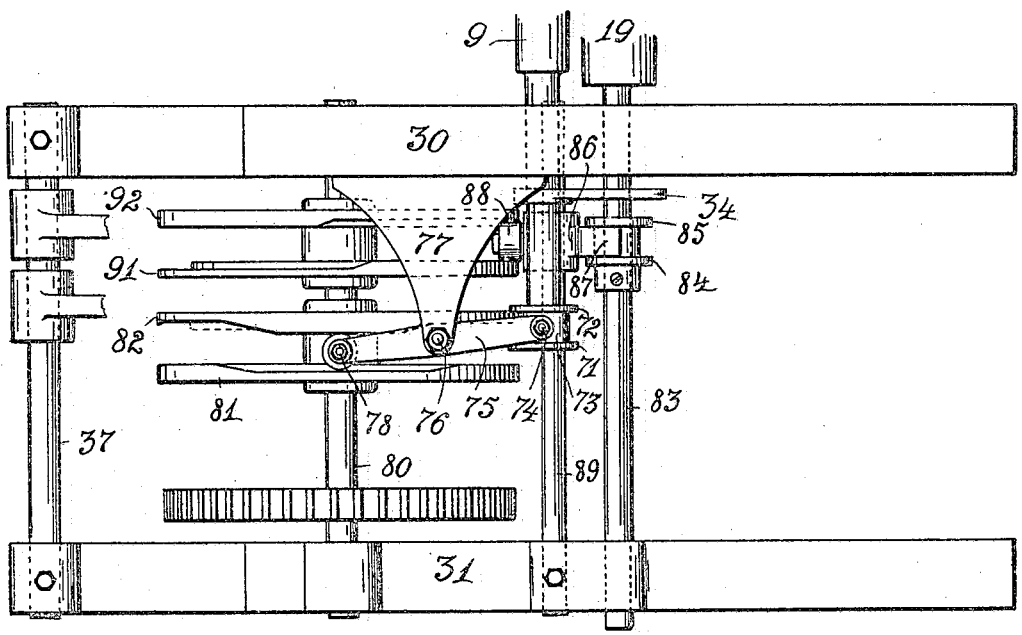

Figure 1 shows a diagram representing a cross-section through the knot-forming mechanism at the moment before the loop-former seizes the shuttle-thread to form a loop on it. Fig. 2 is a similar diagram showing the parts after the loop has been formed and the warp-thread needle has been inserted through said loop and brought in position to allow the shuttle-ring to seize the warp-thread bight for carrying it around the shuttle. Fig. 3 is a detail, being a top view of a part of the guide-combs. Fig. 4 is a detail showing in a front view the relative position between the shuttle-ring hook and the warp-thread needle in the moment when the hook seizes the warp-thread. Fig. 5 is a view of the left-hand side of the machine; Fig. 6, a view of the right-hand side thereof. Fig. 7 is a front elevation of some of the mechanisms at the right-hand side of the machine, and Fig. 8 is a plan view of the mechanism of Fig. 7, (some of the parts being left out to make the drawing clearer.)

1 is a ring provided with teeth 2, said ring inclosing the spool-housing or shuttle 3. The latter projects on one side of the ring with a nose or plate 4, having perforations through which the shuttle-thread is threaded. The shuttle is prevented from turning around with the ring by means of a stationary bar 5, running from one side to the other of the machine. This bar projects into a notch 6 in the said nose 4.

7 is the shuttle-ring hook.

8 is the shuttle-thread loop-former. It is in the form of a hook carried by a shaft 9 capable of rotation. This mechanism forms no part of the invention and is fully described in our prior patent.

The warp-thread needle 10 is carried by a slide 11, which is capable of a to-and-fro movement imparted to it by a crank-and-rod mechanism 12 13. This slide has its guides on a support 19 of angular or wing-like cross-section, which itself is a slide capable of a to-and-fro motion at right angles to the sliding motion of the slide 11, it being carried in guides on a rocking frame 15, which is supported by pins 14 at both sides or ends of the machine, so that it can be rocked from the position shown in Fig. 1 to the position shown in Fig. 2 by means of an arm 16 and rod 26, connected with a suitable cam mechanism or the like. The lateral movement of the support 19 is produced by a mechanism of any suitable construction as common in this kind of machines. The purpose of this movement is to alternately bring the needle 10 to correspond with two adjacent shuttle-threads for each new knot. The lateral movement of the support 19 takes place when the needle 10 is in a retracted position, as in Fig. 1.

Between the two adjacent wings of the rocking frame 15 and the support 19, projecting toward the knotting-point of the machine, a free space is left, as shown, through which the net passes as it is formed, it passing over a beam 27 to a roller on which it is wound up according as it is formed. On the outer edges of the said wings are fixed two comb-like strips of metal 17 and 18, respectively. The comb 18 is merely a notched straight piece of metal, whereas the comb 17 has its teeth bent upwardly, as shown. These combs serve as guides for the threads close to the knotting-point, and the comb 18, which is traversed at the same time and to the same extent as the warp-needle, serves by such movement to cause the warp-thread to be carried sidewise the same distance as the needle.

The operation of the described mechanism is as follows: In the position of parts shown in Fig. 1 the rocking frame holds the needle 10 and the guide-combs 17 18 in an elevated position, so that the shuttle-thread is held nearly vertically adjacent to the hook 8. When the latter performs its loop-forming movement, the rocking frame sinks down, so that its position will be the one shown in Fig. 2. Immediately thereafter the needle 10 is pushed forward by the arm 13, so that it projects through the loop hanging on the hook 8, as shown in Fig. 2, and comes to a standstill close to the side of the toothed ring 2. The hook 7 on the latter now in passing the needle will take hold of the warp-thread, the action being about the same as in a sewing-machine, and carry a bight of the warp-thread around the shuttle. To facilitate the seizing of the warp-thread by the hook 7, the latter is slightly bent laterally, as shown in Fig. 4, and the needle 10 is provided with a lateral depression just inside the needle-hole.

The ring 2 rests between ridges in rollers or beams 21 and its teeth engage teeth on a driving-shaft 22, which receives continuous rotation from the main driving-shaft of the machine by means of gear-wheels.

Referring more particularly to Figs. 6 and 7, 30 is the right-hand side frame of the machine, and 31 an auxiliary frame placed parallel to the frame 30. 32 is a shaft having its bearings in these frames and carrying a toothed wheel 33, (shown only in Fig. 7,) meshing with another toothed wheel (not shown) belonging to the driving-gear of the machine. On the shaft 32 are keyed cam-wheels controlling the rocking motion of the hook-shaft 9 and of the guide and tightening shaft and arms for the warp thereon. The hook-shaft 9 has an arm 34, which by way of a rod 35 is connected with the free end of a lever 36, swinging on the pin or shaft 37. This lever is formed with a ring-shaped enlargement 38, embracing the cam-shaft 32. At opposite sides of this enlargement rollers 39 and 40 are mounted, which rollers are in contact with cam-wheels 41 and 42 on the shaft 32. The working faces of these wheels are of a complementary form, so that the action of the same on the two rollers will be just the same as the action of a cam-groove on a single roller. In Fig. 6 the form of the cam is shown as being simply that of an eccentric disk, which, however, is only for simplifying the drawing. In a similar way the rock-arm 44 of the warp-thread guide and tightening shaft is operated by means of a rod 45, lever 47 with enlargement 48, and rollers 49 and 50, operated by complementary cam-wheels 51 52. In Fig. 5 we have shown the cam mechanisms imparting the rocking motion to the rocking frame carrying the warp-thread needles and the reciprocating motion to the needle-slide 11. These cam mechanisms are exactly the same construction as those just described.

The arm 16 on the rocking frame is by a rod 55 connected with the cam-lever 56, pivoted at 57. Another cam-lever 66 is by means of a rod 65 connected with an arm 64, keyed on a shaft 53, which carries the arms 13, from which the rods 12 run to the slide 11.

The mechanisms for imparting the laterally-reciprocating motion to the shaft 9, carrying the loop-formers, and to the slide 19, on which the aforesaid slide 11 is placed, are shown in Figs. 7 and 8, reference being also had to Figs. 5 and 6. In Fig. 8 the shaft 9 will be seen to be extended beyond the frame 30 and at its end is provided with two shoulders or wings 71 and 72, between which the head 73 of a bolt 74, carried by a horizontal swinging lever 75, projects. This swinging lever is pivoted at 76 on a bracket 77 and has on its other end a bolt 78, with a roller 79 projecting between two cam-disks 81 and 82 on a shaft 80. By the rotation of this shaft the roller 79 will be acted upon by the cams on the inward faces of the disks and the lever will be oscillated and impart a reciprocating motion to the shaft 9. The slide 19 receives its laterally-reciprocating movement in a similar manner from two cam-disks 91 92, placed on the same shaft 80. In Fig. 8 (vide also Fig. 6) will be seen an arm 83, which extends from the said slide beyond the frame 30 and has a bearing in the frame 31, it being axially movable in said bearing. The arm is provided with shoulders 84 85, between which the fork-shaped end 87 of a sliding piece 86 projects. This sliding piece, which is carried by a rod 89, fixed between the frames 30 and 31, is provided with a roller 88, which works between the cam-disks 91 and 92.

We claim—

1. In a net-making machine, a hook capable of engaging a shuttle-thread to form a loop, a needle capable of carrying a bight of the warp-thread through the shuttle-thread loop to bring it in the path of a warp-thread hook, a shuttle, a toothed ring surounding said shuttle, means to support said ring, a toothed wheel to impart rotary motion to said ring and a warp-thread hook on said ring.

2. In a net-making machine the combination with a shuttle-thread loop-forming hook, a shuttle and a warp-thread hook of a warp-thread needle, means to move the needle longitudinally, guides for the shuttle and the warp-thread in the proximity of the needle, and means to alternately bring these guides close to the knot-forming point and to lift them above the shuttle-thread loop-former.

3. In a net-making machine a rocking frame, a wing on the same projecting toward the knot-forming point, a shuttle, a guide-comb for the shuttle-threads on the edge of said wing, a support on said rocking frame, means to impart a reciprocating motion to said support in a direction parallel to the axis of the rocking frame, a wing on said support extending toward the edge of the wing on the rocking frame and a guide-comb for the warp-threads on the edge of said wing, a slide on the rocking frame, means to move the same in a direction at right angles to the motion of the support and warp-thread needles mounted on said slide.

4. In a net-making machine, the combination with a rotatable toothed shuttle-carrier having a hook thereon, a toothed wheel engaging the shuttle-carrier and a shuttle mounted in the carrier having a perforated plate 4 projecting at one side of the carrier and provided with a notch 6; of a stationary bar 5 engaging the notch, a shuttle-thread hook, an oscillating bar 9 on which the said hook is mounted, a warp-thread needle, a slide on which the needle is mounted, mechanism to move said slide to give the needle longitudinal movement, a support for said slide, means to move the support laterally, a frame 15 in which the support is mounted, means to rock the frame, a comb on the support and a comb on the frame having upwardly-bent teeth, said combs opposite one another and between which the finished net passes, means to laterally move the bar 9, substantially as described.

5. In a net-making machine, the combination with a toothed shuttle-carrier, a hook thereon, means to rotate the carrier and a shuttle-thread loop-forming hook; of a warp-thread needle having a bend back of its eye, means to rock the needle into position to be projected through the shuttle-thread hook, means to project the needle through the loop to carry the warp-thread into the path of the shuttle-carrier hook, whereby the point of said hook will pass the needle at its bend and loop the warp-thread around the shuttle, substantially as described.

6. In a net-making machine, a rocking frame having a comb at its front, a support mounted to move laterally in the frame and having a comb at its front, said support having a free space for the passage of the finished net between its under side and the top of the rocking frame, a slide mounted to move in the support transversely and warp-thread needles mounted on the slide, substantially as described.

In testimony that we claim the foregoing as our invention we have signed our names in presence of two subscribing witnesses.

ALEKSANDER OSKAR HAMMER.
GUSTAV HAMMER.

Witnesses:
O. MÜLLER,
JOH. VAALER.